United States Patent
Thompson et al.

(10) Patent No.: US 10,393,220 B2
(45) Date of Patent: Aug. 27, 2019

(54) HEAT DISSIPATION STRUCTURES FOR CRANKSHAFT DAMPERS

(71) Applicant: APROTECH POWERTRAIN LLC, Asheville, NC (US)

(72) Inventors: Scott K. Thompson, Asheville, NC (US); Larry George, Greenfield, IN (US)

(73) Assignee: APROTECH POWERTRAIN LLC, Asheville, NC (US)

( * ) Notice: Subject to any disclaimer, the term of this patent is extended or adjusted under 35 U.S.C. 154(b) by 0 days.

(21) Appl. No.: 15/832,146

(22) Filed: Dec. 5, 2017

(65) Prior Publication Data

US 2019/0170214 A1    Jun. 6, 2019

(51) Int. Cl.
*F16F 15/12* (2006.01)
*F16F 15/30* (2006.01)
*F16F 15/126* (2006.01)

(52) U.S. Cl.
CPC .......... *F16F 15/126* (2013.01); *F16F 15/302* (2013.01)

(58) Field of Classification Search
CPC .... F16F 7/10; F16F 7/104; F16F 7/108; F16F 7/12; F16F 7/121; F16F 7/124; F16F 15/124; F16F 15/1245; F16F 15/126; F16F 15/14; F16F 15/161; F16F 15/167; F16F 15/173; F16F 15/264; F16F 15/302; F16F 15/305; F16F 15/315; F16F 2222/025; F16C 3/16
USPC ....................................... 74/574.4; 123/192.1
See application file for complete search history.

(56) References Cited

U.S. PATENT DOCUMENTS

| | | | |
|---|---|---|---|
| 2,594,555 A | 4/1952 | Hardy | |
| 2,716,904 A | 9/1955 | Schuldt | |
| 2,779,210 A | 1/1957 | Holloway | |
| 2,939,338 A | 6/1960 | Troyer | |
| 3,314,304 A | 4/1967 | Katzenberger et al. | |
| 3,443,454 A | 5/1969 | Hall | |
| 3,462,136 A * | 8/1969 | Rumsey | F16F 1/326 188/268 |
| 3,678,708 A | 7/1972 | Ernst et al. | |
| 3,990,324 A | 11/1976 | Fishbaugh et al. | |
| 4,041,803 A | 8/1977 | Goloff et al. | |
| 4,224,835 A | 9/1980 | Bauer | |
| 4,307,627 A | 12/1981 | Sullivan | |
| 4,781,659 A * | 11/1988 | Gebhardt | F16F 15/136 474/903 |
| 5,829,732 A * | 11/1998 | Yamaguchi | F16F 1/377 248/610 |

(Continued)

FOREIGN PATENT DOCUMENTS

| | | | |
|---|---|---|---|
| DE | 3430298 A1 * | 2/1986 | ............ F16D 3/76 |
| DE | 3929019 A1 * | 3/1991 | ............ F16F 15/126 |

(Continued)

*Primary Examiner* — Adam D Rogers
(74) *Attorney, Agent, or Firm* — Brooks Kushman P.C.

(57) ABSTRACT

A crankshaft damper for attachment to one end of a crankshaft of an engine. The crankshaft damper includes an elastomeric member attached to a hub, and an inertia ring connected to the hub through the elastomeric member. Several different structures for cooling the elastomeric member are disclosed that dissipate heat away from the elastomeric member. Air flow is induced near the elastomeric member by providing air flow openings in the inertia ring or the elastomeric member.

10 Claims, 11 Drawing Sheets

(56) References Cited

U.S. PATENT DOCUMENTS

| | | | |
|---|---|---|---|
| 6,262,505 B1 * | 7/2001 | Hockney | F16C 32/0442 |
| | | | 310/90.5 |
| 6,386,065 B1 * | 5/2002 | Hodjat | F16F 15/126 |
| | | | 474/94 |
| 6,675,759 B2 | 1/2004 | Johnson et al. | |
| 8,567,367 B2 | 10/2013 | Hayes et al. | |
| 8,997,593 B2 * | 4/2015 | Horng | F16H 25/24 |
| | | | 74/89.4 |
| 2016/0061287 A1 * | 3/2016 | Manzoor | F16F 15/30 |
| | | | 74/574.4 |

FOREIGN PATENT DOCUMENTS

| | | | | |
|---|---|---|---|---|
| EP | 3154274 A1 * | 4/2017 | | G11B 33/08 |
| GB | 828354 A * | 2/1960 | | F16F 15/1442 |

\* cited by examiner

HEAT DISSIPATION STRUCTURES FOR CRANKSHAFT DAMPERS

TECHNICAL FIELD

This disclosure relates to an engine crankshaft damper for engines operating at high temperatures.

BACKGROUND

Crankshaft dampers are used to reduce torsional deflections in crankshafts of combustion engines. Crankshaft dampers function by converting torsional deflections into heat which reduces the crankshaft torsional deflections to increase the life of a crankshaft. Crankshaft dampers may be of the elastomeric type or of the viscous fluid type. This disclosure is directed to elastomeric type crankshaft dampers.

Crankshaft dampers are typically attached to the front end of the engine and are normally enclosed in confined spaces. Heat from the engine and other components such as turbochargers, and the like, creates high ambient temperatures in the engine compartment. Heat is also conducted from the engine to the crankshaft damper. The high ambient temperatures and heat conducted by the engine add to the heat created by damping the torsional deflections of the crankshaft.

Elastomeric crankshaft dampers generally include a rigid hub that is secured to the crankshaft. An inertia ring is attached to the hub by an elastomeric member which may be shaped as a ring or a disk. Vibrations of the crankshaft are damped by torsional shearing of the elastomeric member relative to the inertia ring. The inertia of the ring and the torsional spring rate of the elastomeric member are selected to provide a specific natural frequency, at which resonance occurs resulting in maximum heat generation in the crankshaft damper to minimize crankshaft deflection.

All crankshaft dampers, including both viscous and elastomeric crankshaft dampers, have operating temperature limits based on their design and the temperature resistance of the damping materials. Recently released high temperature crankshaft damper elastomers have a higher temperature limit than other types of crankshaft damper elastomers and viscous fluids. However, some applications may exceed the temperature limit of these high temperature crankshaft damper elastomers and, as a result, there is a need for improvements in elastomeric crankshaft dampers to obtain greater heat dissipation.

This disclosure is directed to solving the above problems and other problems as summarized below.

SUMMARY

According to one aspect of this disclosure, a crankshaft damper is disclosed that is adapted to be attached to one end of a crankshaft of an engine. The crankshaft damper includes an elastomeric member attached to a hub, an inertia ring connected to the hub through the elastomeric member, and one or more of several different structural means for cooling the elastomeric member. The means for cooling the elastomer may improve heat dissipation through the damper by conduction, convection, increased surface area, and/or increased air flow.

According to another aspect of this disclosure, the inertia ring may define a plurality of non-cylindrical openings that are larger near the elastomeric member and smaller as the spacing from the elastomeric member increases. The non-cylindrical openings may be triangular or polygonal shaped openings and may have rounded corners. Alternatively, the non-cylindrical openings may be arcuate openings.

The inertia ring may have a back side and a front side include vanes for directing air axially through the openings in the crankshaft damper. The arcuate openings may be aligned with a recessed portion between the vanes to draw air from the arcuate openings.

The crankshaft damper may include a sleeve bonded to the elastomeric member that has higher thermal conductivity than the inertia ring. The sleeve functions to conduct away from the elastomeric member. The inertia ring may also define a plurality of arcuate openings that extend axially through the inertia ring and function direct air through the openings to cool the elastomeric member, in combination with portions of an outer surface of the sleeve.

According to another aspect of this disclosure, crankshaft damper may include an inertia ring that defines a plurality of cylindrical openings, the openings having a central axis that is circumferentially offset in an axial direction and disposed at an angle relative to a rotational axis of the crankshaft damper in the axial direction. The central axes of the cylindrical openings may be disposed at a selected radial distance from the rotational axis of the crankshaft damper. The central axes may be oriented to open into an area in front of the crankshaft damper to draw air from in front of the crankshaft damper through the openings when the crankshaft damper is rotated.

In another variation, the crankshaft damper may include an inertia ring that defines a plurality of openings having a central axis that is circumferentially offset in an axial direction and disposed at an angle relative to a rotational axis of the crankshaft damper in the axial direction. The openings may have a tapered cross-section including an intermediate portion having a reduced cross-section compared to front and rear portions of the openings. The intermediate portion creates a venturi effect with increased air flow velocity to increase heat dissipation from an interior portion of the elastomeric member.

The hub may include a plurality of vanes that are angled to draw air from an area in front of the crankshaft damper to an area in back of the crankshaft damper and the hub may define a plurality of openings between the vanes.

In another variation, the inertia ring may include a front portion and a back portion that each partially define a plurality of radially extending arcuate vanes that define a plurality of recesses between the arcuate vanes. The front portion and the back portion may be assembled together over the elastomeric member with a plurality of fasteners. The arcuate vanes are spaced apart to define air flow passages through which air is pumped radially outwardly to cool the elastomeric member. The front portion of the inertia ring may further include a first cylindrical collar and the back portion of the inertia ring may include a second cylindrical collar. The first and second cylindrical collars are abutted when the inertia ring is assembled over the elastomeric member.

The inertia ring is connected to the hub through the elastomeric member and the inertia ring may define a plurality of radially extending bores that are aligned with at least one gap defined by the elastomeric member and a second plurality of holes defined by the hub, wherein air flow is directed radially outwardly from the hub through gap in the elastomeric member and the bores in the inertia ring. The elastomeric member may include a front ring and a rear ring that define the at least one gap between the front ring and the rear ring. Alternatively, at least one gap may be defined by the elastomeric member and may include a third plurality of holes that are aligned with the first and second plurality of holes.

In another variation, a crankshaft damper that is adapted to be attached to one end of a crankshaft of an engine may comprise a disk-shaped hub attached to one end of the crankshaft. An inertia ring is connected to the hub through the elastomeric member and is received in a radially extending slot defined by the elastomeric member. The inertia ring is attached to one radially extending side of the elastomeric member and a cup-shaped case is used to secure the elastomeric member and the inertia ring together. A plurality of radially extending bores defined by the inertia ring are aligned with a plurality of holes defined by the case, wherein air flow is facilitated radially outwardly from the hub through the inertia ring and the case. The elastomeric member may include a first ring and a second ring assembled on opposite sides of the hub.

In a further embodiment, the inertia ring may be connected to a disk-shaped hub through the elastomeric member with the hub being received in a radially extending slot defined by the elastomeric. A cup-shaped case secures the elastomeric member and the inertia ring together and a plurality of radially extending bores may be defined by the elastomeric member in alignment with a first plurality of holes defined by the cup-shaped case and a second plurality of holes defined by the inertia ring, wherein air flows radially outwardly from the hub through the elastomeric member, the inertia ring, and the case. In addition, a plurality of axially extending bores may be defined by the inertia ring that extend from a radially extending side of the inertia ring with each axially extending bore opening into one of the radially extending bores.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. Features of different embodiments may be combined with other embodiments. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
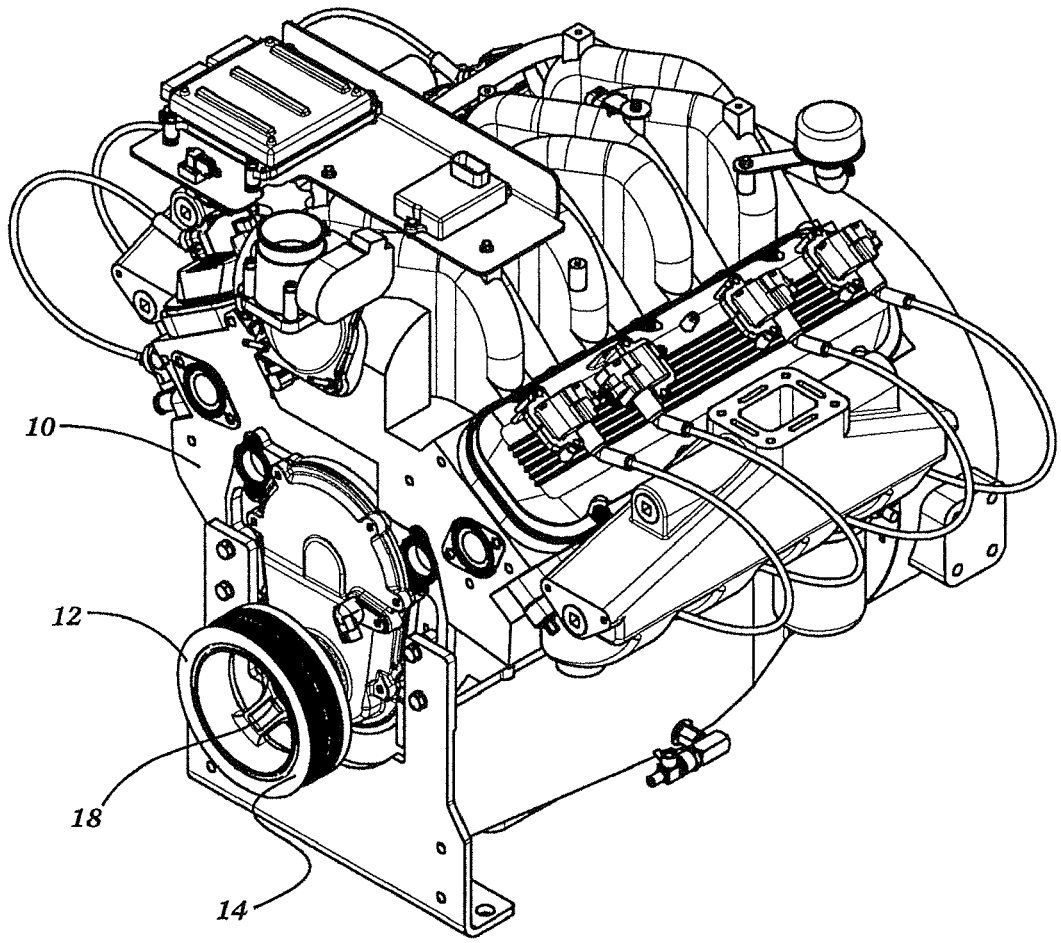
FIG. 1 is a front perspective view of an engine including a crankshaft damper attached to the front end of a crankshaft.

Referring to FIG. 1, an engine 10 is shown that is equipped with a crankshaft damper 12. The crankshaft damper 12 has a front side 14 and a back side 16. The crankshaft damper 12 is attached to a crankshaft 18 (the location of which is indicated by reference numeral 18 in FIG. 1) that extends through the lower portion of the engine 10, as is well known in the art.

Figure 2:
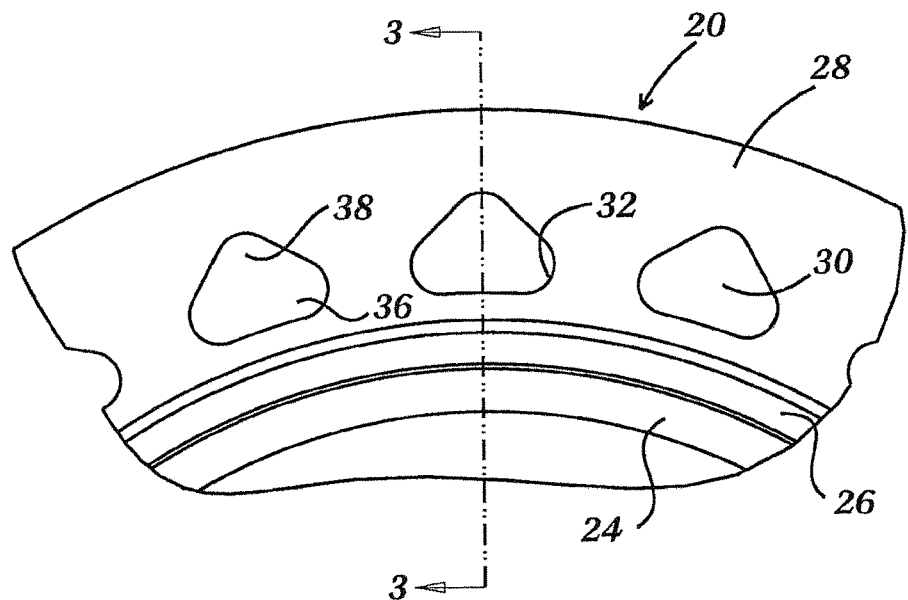
FIG. 2 is a fragmentary front elevation view of a first embodiment of a crankshaft damper.
Figure 3:
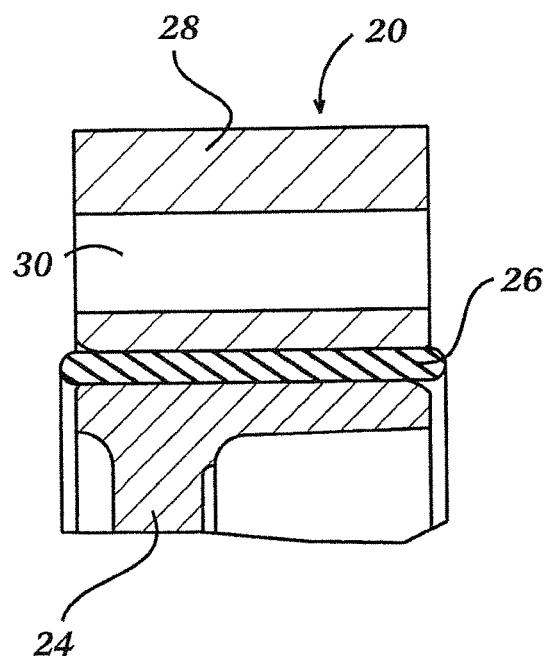
FIG. 3 is a cross-section view taken along the line 3-3 in FIG. 2.

Referring to FIGS. 2 and 3, a first crankshaft damper is generally indicated by reference numeral 20. The crankshaft damper 20 includes a hub 24 that is enclosed within an elastomeric member 26. An inertia ring 28 is assembled over the elastomeric member 26. The inertia ring 28 defines a plurality of triangular openings 30 that have rounded corners 32. The triangular openings 30 have a larger portion 36 and a smaller portion 38. The larger portion 36 is located near the elastomeric member 26 and the smaller portion 38 is located radially outward relative to the larger portion 36. The larger portion 36 provides a larger surface area for improving heat dissipation away from the crankshaft damper through conduction, convection, and increased air flow across the surface. The smaller portion 38 limits the reduction of inertia caused by including the triangular openings 30. The triangular openings 30 increase air flow and increase surface area. The triangular openings 30 may also be referred to as a non-cylindrical opening or a polygonal opening.

Figure 4:
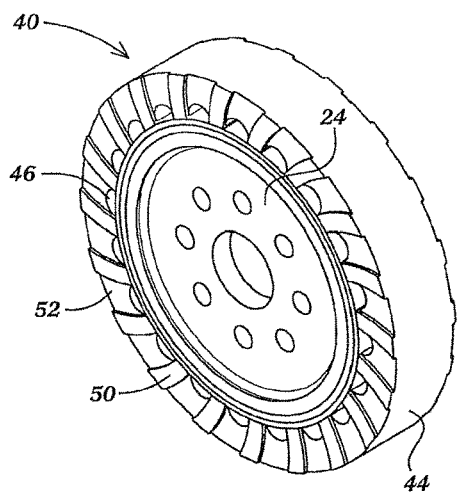
FIG. 4 is a front perspective view of a second embodiment of a crankshaft damper.
Figure 5:
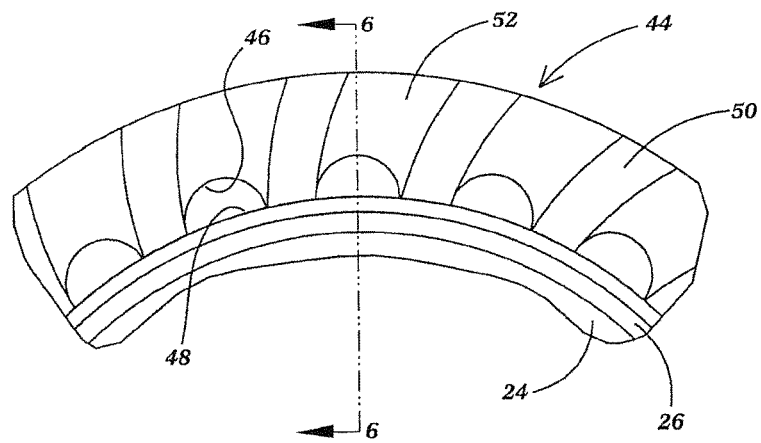
FIG. 5 is a fragmentary front elevation view of the second embodiment of a crankshaft damper.
Figure 6:
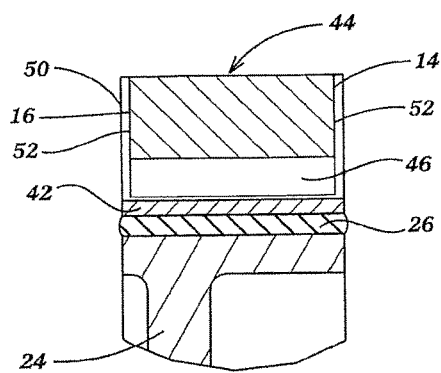
FIG. 6 is a cross-section view taken along the line 6-6 in FIG. 5.

Referring to FIGS. 4-9, a second crankshaft damper is generally indicated by reference numeral 40. The second crankshaft damper 40 is shown in FIGS. 4-6. References to similar parts of the second crankshaft damper 40 are also used with reference to FIGS. 7-9. The second crankshaft damper 40 includes a sleeve 42 that is preferably made of a material having a higher coefficient of thermal conductivity than the inertia ring 44. The sleeve 42 may be made of aluminum, steel, stainless steel, or another type of material having a higher coefficient of thermal conductivity than the inertia ring 44. The inertia ring 44 may be made of steel or cast iron or other high mass material to maximize the inertial force applied to the elastomeric member 26.

A plurality of arcuate openings 46 are defined on the inner diameter of the inertia ring 44. The arcuate openings 46 are generally semi-cylindrical in shape but may be formed in other shapes with the openings 46 having a larger cross-sectional area near the sleeve 42 and a reduced cross-sectional area nearer to the inertia ring 44. The arcuate openings 46 are formed in the inertia ring 44 and are also partially defined by the outer surface 48 of the sleeve 42.

The arcuate openings 46 may be located with respect to a plurality of vanes 50 and recesses 52 that are formed on one or both of the front side 14 and back side 16 of the crankshaft damper 40. The arcuate openings 46 are aligned with the recesses 52 formed between adjacent vanes 50. The vanes 50 cooperate with the arcuate openings 46 to create an air pump that increases airflow through arcuate openings 46. The vanes increase airflow through the arcuate openings 46. The higher thermal conductivity of the outer surface 48 of the sleeve 42 increases heat dissipation away from the elastomeric member 26.

Figure 7:
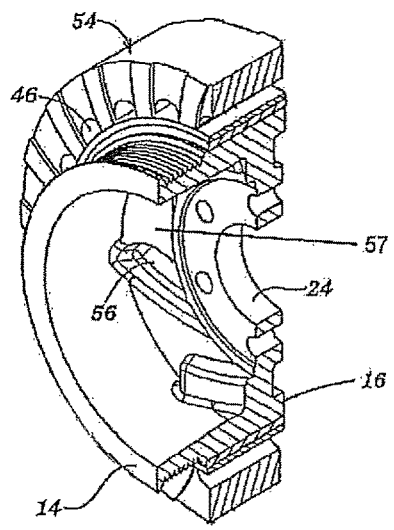
FIG. 7 is a fragmentary front perspective view partially in cross-section of a third embodiment of a crankshaft damper.
Figure 8:
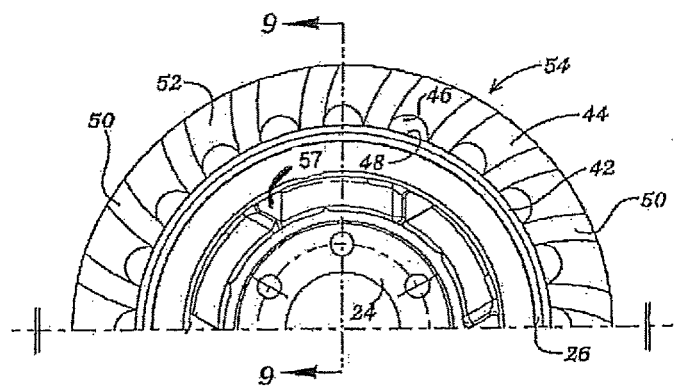
FIG. 8 is a fragmentary front elevation view of the third embodiment of a crankshaft damper.
Figure 9:
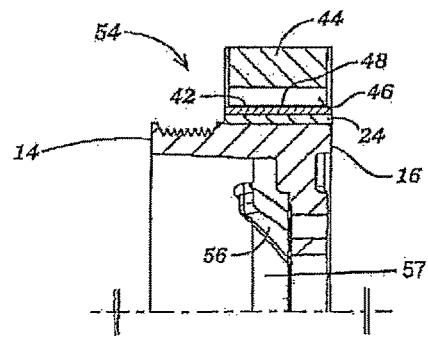
FIG. 9 is a cross-section view taken along the line 9-9 in FIG. 8.

Referring to FIGS. 7-9, a third crankshaft damper 54 is illustrated that is similar to the second crankshaft damper 40. Similar elements are referred to by the same reference numerals that were used in the description of FIGS. 4-6 above. A third crankshaft damper 54 differs from the second crankshaft damper 40 because it includes a plurality of spokes 56 and openings 57 that create airflow through the hub 24. The spokes 56 function is a fan or impeller blade to draw cool air from the front side 14 of the crankshaft damper 54. The sleeve 42 and inertia ring 44 defines the arcuate openings 46 and function in the same manner in the third crankshaft damper embodiment 54 as in the second crankshaft damper 40.

Figure 10:
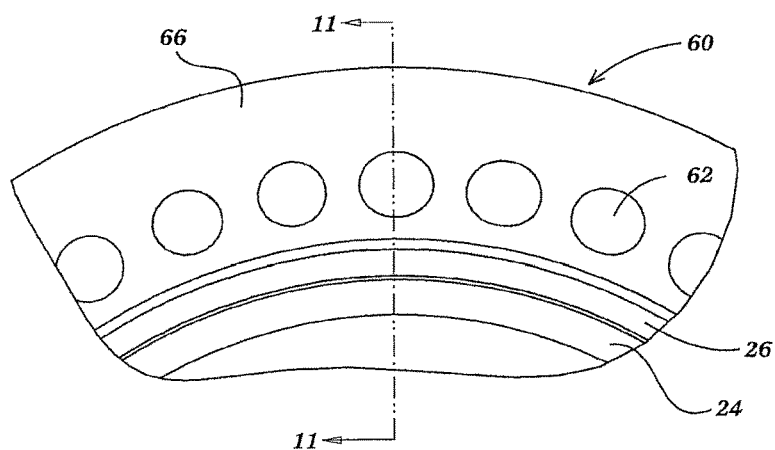
FIG. 10 is a is a fragmentary front elevation view of a fourth embodiment of a crankshaft damper.
Figure 11:
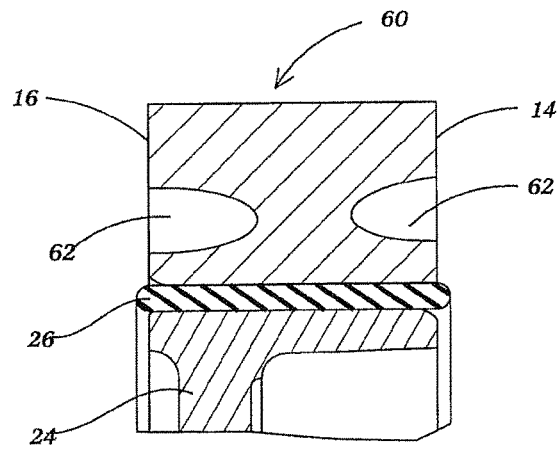
FIG. 11 is a fragmentary cross-section view taken along the line 11-11 in FIG. 10.
Figure 12:
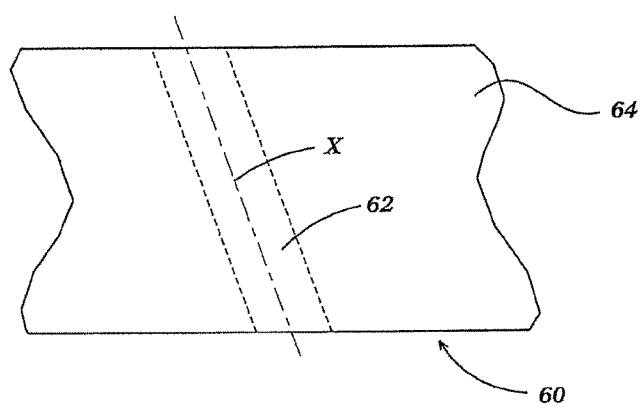
FIG. 12 is a fragmentary top plan view of the fourth embodiment of a crankshaft damper.

Referring to FIGS. 10-12, a fourth crankshaft damper 60 is illustrated that includes a cylindrical opening 62. The cylindrical opening 62 is defined by the inertia ring 66 and extends in a circumferentially offset axial direction as best shown in FIG. 12. The offset of the cylindrical opening 62 is oriented to increase airflow through the opening 62. The cylindrical opening 62 has a cylindrical axis X that is circumferentially offset and extends in the axial direction through the inertia ring 66. The cylindrical opening 62 is located proximate the elastomeric member 26 on the opposite side from the hub 24. As the crankshaft damper 62 rotates, air is drawn in through the leading edge on the front side 14 and flows through the cylindrical opening 62 to cool the elastomeric member 26.

Figure 13:
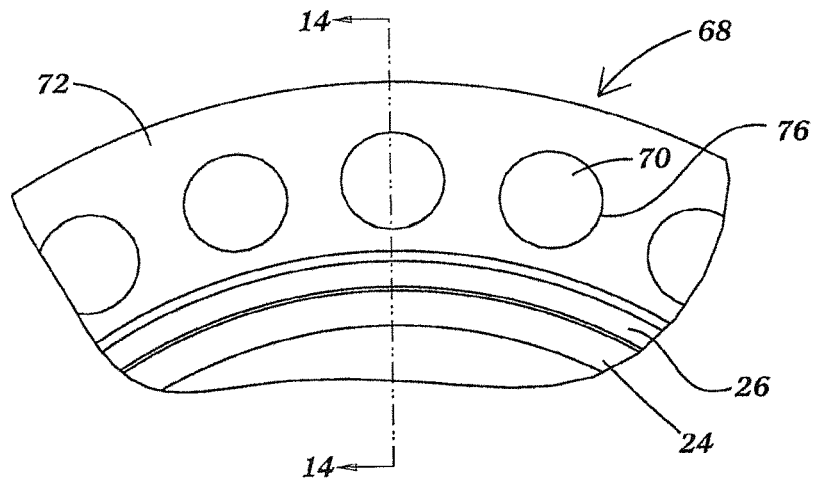
FIG. 13 is a fragmentary front elevation view of a fifth embodiment of a crankshaft damper.
Figure 14:
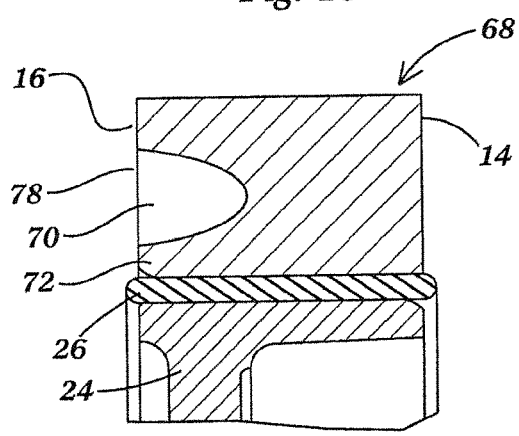
FIG. 14 is a fragmentary cross-section view taken along the line 14-14 in FIG. 13.
Figure 15:
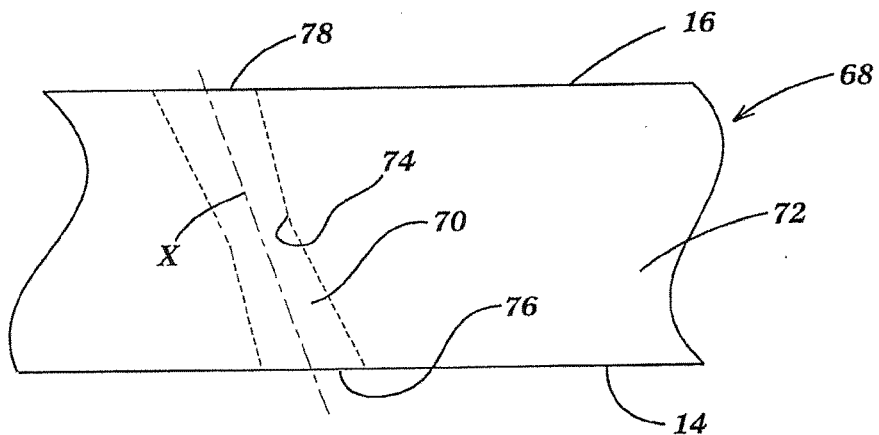
FIG. 15 is a fragmentary top plan view of the fifth embodiment of a crankshaft damper.

Referring to FIGS. 13-15, a fifth crankshaft damper 68 is shown that is similar in many respects to the embodiment of the fourth crankshaft damper 60 but includes a venturi opening 70 that is defined in the inertia ring 72. A constriction 74 is formed in the inertia ring 72 between a mouth 76 formed on the front side 14 and an outlet 78 formed on the back side 16. The constriction 74 functions as a venturi causing the air velocity to be greatest at the narrow cross-section in the middle of the inertia ring 72. The increased air velocity leads to higher heat dissipation in the middle of the elastomeric member 26 where heat generation caused by torsional shearing of the elastomeric member relative to the inertia ring.

Figure 16:
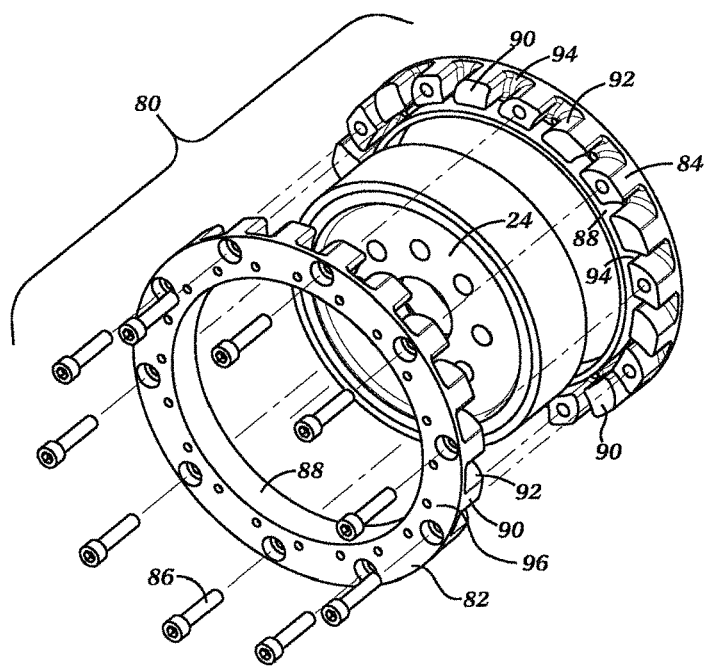
FIG. 16 is an exploded perspective view of a sixth embodiment of a crankshaft damper.
Figure 17:
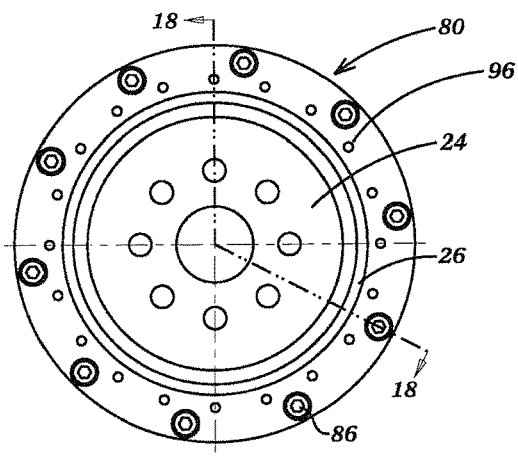
FIG. 17 is a is a front elevation view of a sixth embodiment of a crankshaft damper.
Figure 18:
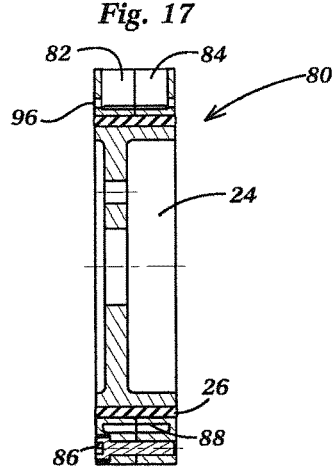
FIG. 18 is a cross-section view taken along the line 18-18 in FIG. 17.
Figure 19:
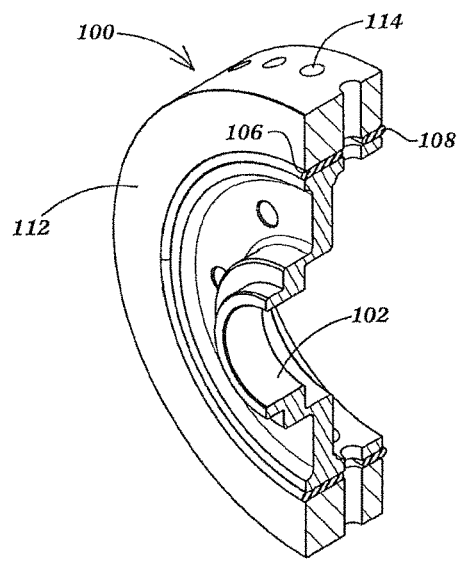
FIG. 19 is a fragmentary front perspective view partially in cross-section of a seventh embodiment of a crankshaft damper.
Figure 20:
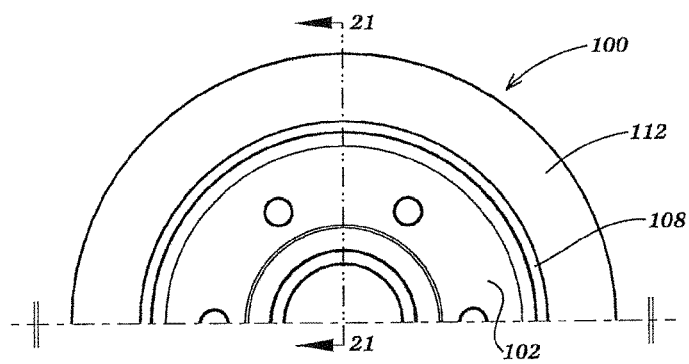
FIG. 20 is a fragmentary front elevation view of the seventh embodiment of a crankshaft damper.
Figure 21:
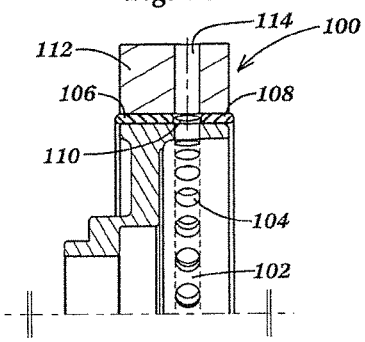
FIG. 21 is a cross-section view taken along the line 21-21 in FIG. 20.
Figure 22:
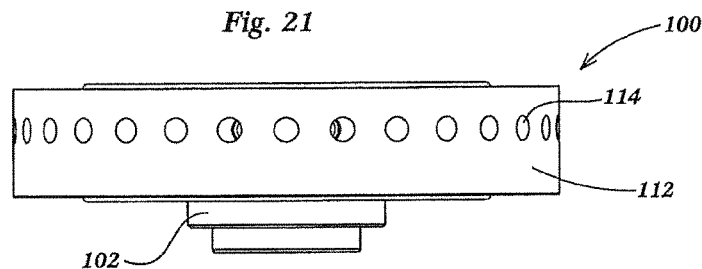
FIG. 22 is a top plan view of the seventh embodiment of a crankshaft damper.

Referring to FIGS. 16-18, a sixth crankshaft damper 80 is illustrated that includes a front part 82 and a rear part 84 that are joined together by bolts 86 or other fasteners to form an inertia ring. A collar 88 is formed by the joining of the front and rear parts 82 and 84. Collar 88 is a thin metallic collar that is assembled over the elastomeric ring 26 that is in turn assembled over the hub 24. When the front and rear parts 82 and 84 are assembled, a plurality of internal vanes 90 are formed that are used to create airflow over the collar 88. The collar 88 is heated by the elastomeric member 26 and dissipates heat through the collar 88 as air flows across arcuate surfaces 92 of the vanes 90. A plurality of radial air flow passages 94 are formed between the internal vanes. A plurality of air inlet holes 96 are located on each face of the inertia ring that allow air flow into the radial air flow passages 94. Air is drawn away from the collar 88 through the radial air flow passages 94 to dissipate heat from the elastomeric member 26.

Referring to FIGS. 19-22, a seventh crankshaft damper 100 is disclosed that includes a hub 102 that defines a plurality of holes 104 in an axially extending flange portion of the hub 102. An inner elastomeric member 106 and an outer elastomeric member 108 are secured to the hub 102 on axially opposite sides of the holes 104. A gap 110 is defined between the inner elastomeric member 106 and the outer elastomeric member 108. An inertia ring 112 includes a plurality of radial bores 114. The radial bores 114 are aligned with the gap 110 and the hole 104 to provide a radially extending hole through the hub 102 between the elastomeric members 106 and 108 and through the radial bores 114. In the seventh crankshaft damper 100, airflow through the holes 104, gap 110 and radial bore 114 is used to cool the inner and outer elastomeric members 106 and 108.

Figure 23:
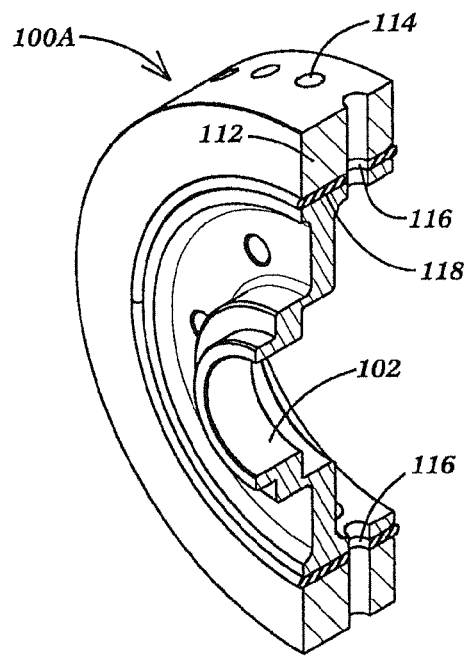
FIG. 23 is a perspective view partially in cross-section view of a version of the seventh embodiment having and elastomeric member that includes a plurality of holes.
Figure 24:
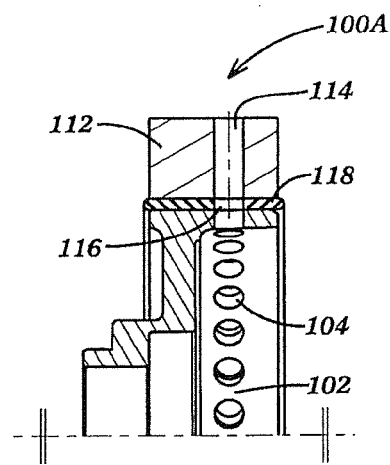
FIG. 24 is a cross-section similar to FIG. 21 of the version shown in FIG. 23.
Figure 25:
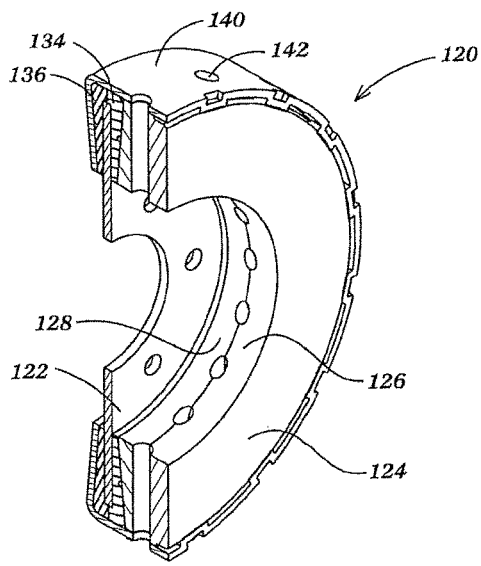
FIG. 25 is a fragmentary front perspective view partially in cross-section of an eighth embodiment of a crankshaft damper.
Figure 26:
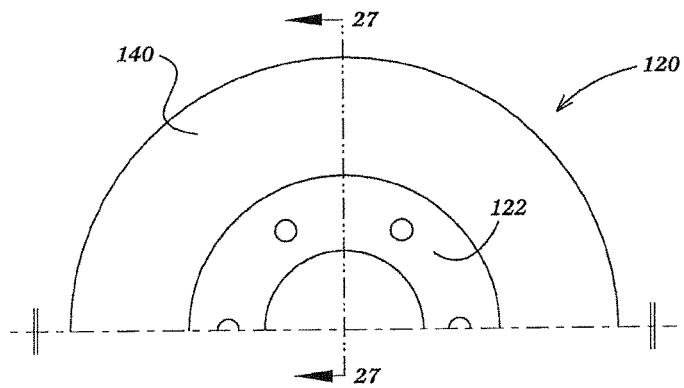
FIG. 26 is a fragmentary front elevation view of the eighth embodiment of a crankshaft damper.
Figure 27:
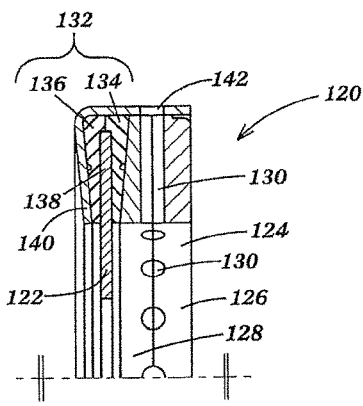
FIG. 27 is a cross-section view taken along the line 27-27 in FIG. 26.
Figure 28:
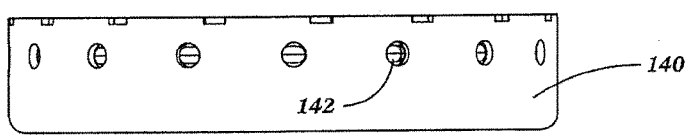
FIG. 28 is a top plan view of the eighth embodiment of a crankshaft damper.
Figure 29:
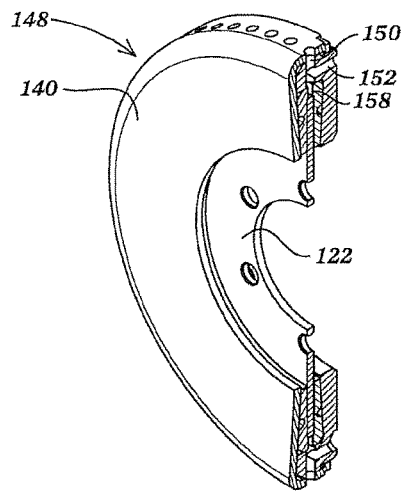
FIG. 29 is a fragmentary front perspective view partially in cross-section of a ninth embodiment of a crankshaft damper.
Figure 30:
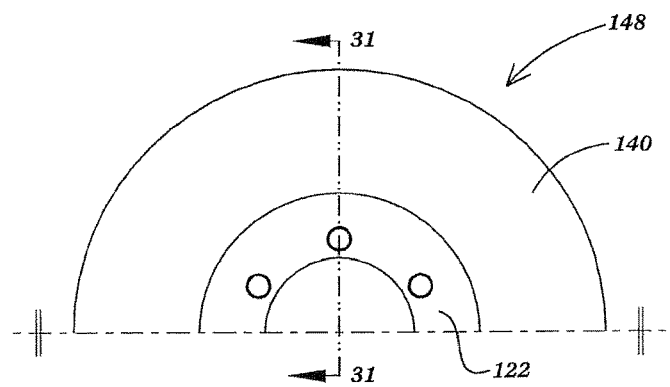
FIG. 30 is a fragmentary front elevation view of the ninth embodiment of a crankshaft damper.
Figure 31:
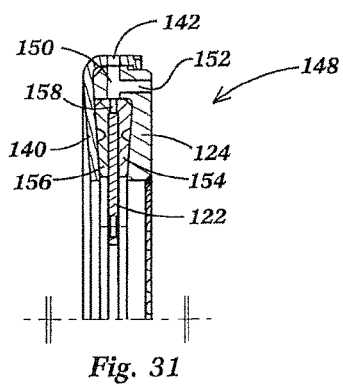
FIG. 31 is a cross-section view taken along the line 31-31 in FIG. 30.
Figure 32:
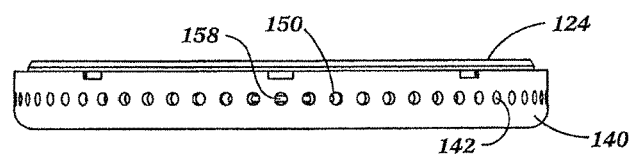
FIG. 32 is a top plan view of the ninth embodiment of a crankshaft damper.

Referring to FIGS. 23-24, a version of the seventh embodiment 100A is shown that includes a plurality of holes 116 are defined by an elastomeric member 118. This version does not include the gap 110 is defined between the inner elastomeric member 106 and the outer elastomeric member 108 because the holes 116 allow airflow through the elastomeric member 118. In all other material respects this version is like that disclosed with reference to FIGS. 19-22.

Referring to FIGS. 25-32, a different style of crankshaft damper is disclosed. Due to the similarities in the two embodiments, the same reference numerals will be used to refer to similar parts in the two different embodiments.

The eighth crankshaft damper 120 includes a hub disk 122 that receives an inertia ring 124. The inertia ring 124 includes a first part 126 and a second part 128. The first and second parts 126 and 128 of the inertia ring 124 are axially assembled together on one axial side of the hub disk 122.

The first and second parts 126 and 128 define a plurality of radial bores 130 that extend radially through the inertia ring 124. An elastomeric member 132 is formed by a first ring 134 and a second ring 136. The hub disk 122 is a flat disk shape and is received in a slot 138 defined by the first and second rings 134 and 136. A case 140 receives the inertia ring 124 and elastomeric member 132 and hub disk 122. The case 140 is crimped over the outside of the first part 126 of the inertia ring 124. A plurality of holes 142 are defined by the case 140 and are aligned with the radial bores 130 and the inertia ring 124 when the crankshaft damper 120 is assembled. Air flow is directed from the hub disk 122 from the inner diameter of the inertia ring 124 through the inertia ring 124 through the radial bores 130 and inertia ring 124 and through the holes 142 formed in the case 140. Air flows from the inner diameter of the inertia ring 124 to dissipate heat from the elastomeric member 132 as the air flows through the holes 142.

Referring to FIGS. 29-32, a ninth crankshaft damper 148 is illustrated that is similar in many respects to the embodiment shown in FIGS. 25-28. The ninth crankshaft damper 148 includes a radial bore 150 that is defined by the inertia ring 124. An axial bore 152 extends from a radially extending side of the inertia ring 124 to the radial bore 150. A first elastomeric member 154 and a second elastomeric member 156 receive the hub disk 122 and are sandwiched by the first and second elastomeric members 154 and 156. A gap 158 is defined between the first and second elastomeric members 154 and 156 that opens into the radial bore 150. The gap 158 extends from the hub disk 122 to the radial bore 150. Heat is dissipated through the radial hub disk 122 from the first and second elastomeric members 154 and 156. Heat is then dissipated through the hub disk 122 and through the gap 158 to the radial bore 150. Heated air then flows through the holes 142 in the case 140.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A crankshaft damper adapted to be attached to one end of a crankshaft of an engine comprising:
    a hub;
    an elastomeric member attached to the hub;
    an inertia ring connected to the hub through the elastomeric member; and
    a sleeve bonded to the elastomeric member, wherein heat is conducted away from the elastomeric member by the sleeve via the elastomeric member, the sleeve having a higher coefficient of thermal conductivity than the inertia ring, and wherein the inertia ring defines a plurality of openings in combination with portions of an outer surface of the sleeve, wherein the openings extend axially through the inertia ring, and wherein the inertia ring has a back side and a front side that each include vanes.

2. The crankshaft damper of claim 1 wherein the hub includes a plurality of spokes that are angled to draw air from an area in front of the crankshaft damper to an area in back of the crankshaft damper, wherein the hub defines a second plurality of openings between the spokes.

3. The crankshaft damper of claim 1 wherein the openings are aligned with a recessed portion between the vanes, wherein the vanes draw air from the openings.

4. A crankshaft damper adapted to be attached to a first end of a crankshaft of an engine comprising:
    a hub attached to the first end of the crankshaft;
    an elastomeric member attached to the hub;
    an inertia ring connected to the hub through the elastomeric member, the inertia ring defining a plurality of non-cylindrical openings extending through the inertia ring from a front side to a back side of the inertia ring that are shaped to be larger where proximate to the elastomeric member and being smaller with increased spacing from the elastomeric member, wherein the front side faces away from the engine, and wherein the back side and front side each include vanes for directing air axially through the openings in the crankshaft damper; and
    a sleeve bonded to the elastomeric member having higher thermal conductivity than the inertia ring, wherein heat is conducted away from the elastomeric member by the sleeve, and wherein the plurality of non-cylindrical openings are arcuate openings in combination with portions of an outer surface of the sleeve, wherein the openings extend axially through the inertia ring and function to cool the elastomeric member by conduction through the sleeve and by air.

5. A crankshaft damper adapted to be attached to one end of a crankshaft of an engine comprising:
    a hub attached to the one end of the crankshaft;
    an elastomeric member attached to the hub; and
    an inertia ring connected to the hub through the elastomeric member, the inertia ring defining a plurality of cylindrical openings, the openings having a central axis that is circumferentially offset in an axial direction and disposed at an angle relative to a rotational axis of the crankshaft damper in the axial direction.

6. The crankshaft damper of claim 5 wherein the central axes of the cylindrical openings are disposed at a selected radial distance from the rotational axis of the crankshaft damper.

7. The crankshaft damper of claim 5 wherein the central axes are oriented to open into an area in front of the crankshaft damper to draw air from in front of the crankshaft damper through the openings when the crankshaft damper is rotated.

8. A crankshaft damper adapted to be attached to one end of a crankshaft of an engine comprising:
    a hub attached to the one end of the crankshaft;
    an elastomeric member attached to the hub; and
    an inertia ring connected to the hub through the elastomeric member, the inertia ring defining a plurality of openings, the openings having a central axis that is circumferentially offset in an axial direction and disposed at an angle relative to a rotational axis of the crankshaft damper in the axial direction, and wherein the openings have a tapered cross-section, wherein an intermediate portion of the openings in the inertia ring have a reduced cross-section compared to front and rear portions of the openings to create a venturi effect with increased air flow velocity in the intermediate portion to increase heat dissipation from an interior portion of the elastomeric member.

9. The crankshaft damper of claim 8 wherein the central axes are oriented to open into an area in front of the crankshaft damper to draw air from the area in front of the crankshaft damper through the openings when the crankshaft damper is rotated.

10. A crankshaft damper adapted to be attached to one end of a crankshaft of an engine comprising:
   a hub attached to the one end of the crankshaft;
   an elastomeric member attached to the hub; and
   an inertia ring connected to the hub through the elastomeric member, wherein the inertia ring includes a front portion and a back portion that each partially define a plurality of radially extending arcuate vanes that define a plurality of recesses between the arcuate vanes.

* * * * *